Jan. 12, 1960  L. HOSCH  2,920,350
PROCESS FOR THE MANUFACTURE OF THERMOPLASTIC
ARTICLES HAVING DESIGNS THEREIN
Filed Feb. 6, 1956

INVENTOR
LUDWIG HOSCH
BY
his ATTORNEYS

United States Patent Office 2,920,350
Patented Jan. 12, 1960

2,920,350
PROCESS FOR THE MANUFACTURE OF THERMOPLASTIC ARTICLES HAVING DESIGNS THEREIN

Ludwig Hosch, Darmstadt, Germany, assignor to Rohm & Haas G.m.b.H., Darmstadt, Germany Application February 6, 1956, Serial No. 563,808

Claims priority, application Germany February 9, 1955

7 Claims. (Cl. 18—48.8)

This invention relates generally to a method of molding synthetic polymerizable compounds to produce designs and artistic effects therein.

It has been found that synthetic polymerized compounds which have internal configurations and artistic effects can be manufactured in the manner described below.

A piece, for example, in foil or sheet form, of plastic material which swells considerably under the influence of suitable agents is placed in a mold of desired shape. The plastic material is then surrounded within the mold by the swelling agent, and under its influence the sheet will undergo a considerable increase of volume. In view of the fact that expansion must take place within the confines of the mold, if the piece to be expanded has one or more dimensions approximately the size of the mold, a controlled formation of creases or folds will result, dependent upon the adjustment and relationship between the mold dimensions, the size and shape of the plastic article inserted, and the amount and type of swelling imposed upon it. The resulting article has a novel design contributed, to a large extent, by the configuration of the swollen sheet.

The preferred swelling agent is a polymerizable liquid monomer according to this invention, and would include all such monomers having the group $CH_2=C<$. Styrene and acrylic acid as well as its derivatives and homologues, such as methacrylic acid methyl ester, are particularly suitable. For the sake of convenience, these materials will be referred to as monomers throughout the specification.

The plastic articles to be utilized according to this invention are polymers which swell to a substantial degree on contact with the above described polymerizable liquid monomers. The more suitable materials include polyvinyl chloride, cellulose esters, such as cellulose acetate butyrate, and other synthetic materials. The expandable material is to be understood as including any polymeric material which will expand upon contact with the liquid monomer. The expandable material often will be in the form of sheets, but may be in any form which in conjunction with the mold dimensions and the swelling agent will give the effect desired.

The molds employed according to this invention may be of many different shapes. A particularly novel and preferred effect is obtained by using a mold chamber such as that shown in German Patent No. 639,095. If desired, the expandable materials may also be introduced into tubes made of thermoplastic synthetic materials manufactured, for example, in accordance with the centrifugal method shown in German Patent No. 673,394.

The invention will be more readily understood by reference to the attaching drawing, in which.

Figure 1:
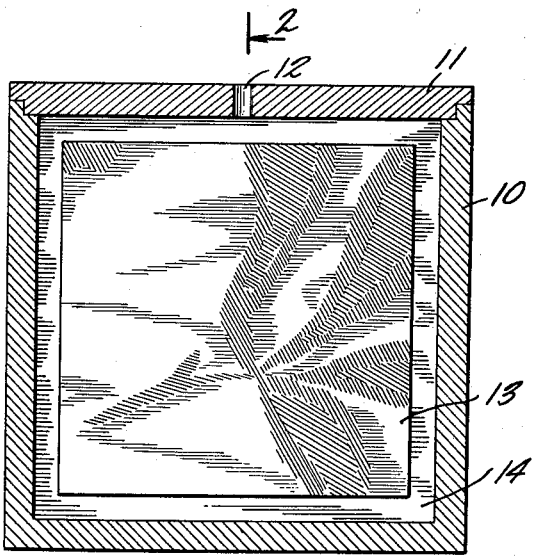
Figure 1 is a plan view of a mold suitable for use according to this invention having a sheet positioned therein.
Figure 2:
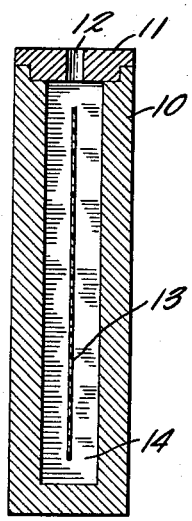
Figure 2 is a view in section of the apparatus of Figure 1 taken along lines 2—2 thereof.

Referring to Figures 1 and 2, an appropriate mold 10 is provided having a closure 11 and an opening 12 in said closure 11 through which a liquid monomer can be placed in the mold. A sheet of swellable plastic material 13 is suspended in the center of the mold cavity 14.

According to the method of this invention, a sheet of swellable plastic material 13 is suspended in the mold cavity 14 and the mold cavity 14 is filled with a liquid monomer. A polymerization accelerator is added with the monomer and the mold is closed. The sheet expands on contact with the liquid monomer and after a suitable period, fills the entire surface of the chamber. The monomer is then subjected to suitable conditions of heat and pressure to cause complete polymerization thereof. During this time, further expansion of sheet 13 takes place.

Figure 3:
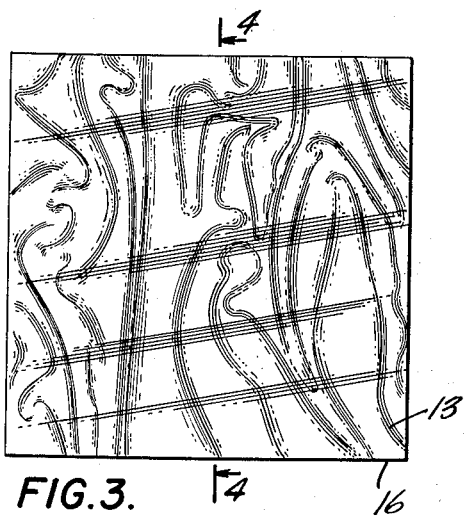
Figure 3 is a plan view of a polymerized article prepared according to the process of this invention.
Figure 4:
Figure 4 is a view in section of the article of Figure 3 taken along lines 4—4 thereof.

Figures 3 and 4 show the relative positions of the expanded sheet 13 and the polymerized monomer 16 at the completion of the process. The sheet 13 has expanded in all directions, resulting in a convoluted continuous layer of plastic material embedded in a solid plastic mass.

The effects obtained by means of the method herein described are manifold. For example, molding of a colorless expandable sheet with a colorless liquid monomer according to the method of this invention results in a solid transparent synthetic material showing portions of varying refraction of light. Molding of these materials in the molds of German Patent No. 639,095 provides large plates of synthetic material suitable for use as wall covering, translucent windows, and the like, and when used in this manner produce a very pleasing artistic effect.

Another pleasing effect is obtained by using an opaque expandable sheet with a colorless liquid monomer in a mold as described in German Patent No. 639,095. The plates produced resemble draped fabrics.

Additional unusual effects are obtained by using transparent sheets and liquid monomers of different colors made by dyeing compounds or by introducing substances therein causing clouding or pigmentation, as for example with pearl essence.

In accordance with known methods, a finely divided polymer, based either on the same or on a related monomer, may be introduced into the liquid monomer, either prior to or during the molding procedure. This technique is sometimes referred to as monomer-polymer molding, and is explained in Vinyl and Related Polymers, Schildknecht, Wiley & Sons, N. Y., 1952, page 203 et seq. Similarly, the liquid monomer may be partially polymerized prior to molding and, where desired, a polymer based either on the same or a related monomer may be employed with the partially polymerized liquid monomer. Techniques of this type provide additional opportunity to vary the artistic effects obtained by this process.

The expandable materials may be of a variety of sizes and shapes, depending upon the mold shape and dimensions and upon the effect desired. If a sheet form is used, it may be cut into pieces or strips before insertion and arranged in the mold to provide additional novel effects, either alone or associated with other materials.

The suitability of a given polymer for use as an expanding sheet may be determined by contacting the material in question with the liquid monomer and determining the degree of swelling obtained. There may be additional expansion of the sheet during the polymerization which further increases the formation of the creases or folds. The additional amount of swelling due to polymerization also may be determined by testing, so that the ultimate effect may be determined and utilized. In this manner the properties of the materials are established and also the dimensions of the materials and the mold required for the desired effect ascertained.

Additional variations are known in the manufacture of the aforementioned synthetic materials and may be used in connection with the method herein disclosed. For example, cross-linking compounds characterized by the presence of a minimum of two nonconjugate double bonds in a molecule and capable of polymerization may also be employed for the purpose of increasing the hardness of the polymerized article. In addition, a mixture consisting of an unsaturated polyester and a monomeric polymerizable compound used for the manufacture of polyester resins may also be employed as the swelling agent.

*Example*

A transparent polyvinyl chloride sheet 0.01 cm. in thickness and measuring 80 x 160 cm., which has been dyed red, is placed in a glass chamber 0.4 cm. wide and measuring 100 x 200 cm., in accordance with German Patent No. 639,095. The chamber is filled with methacrylic acid methyl ester in which 6% polymethyl methacrylic acid has been dissolved. An accelerator comprising 0.1% by weight of benzoyl peroxide is dissolved in the monomer. After one-half to one hour of standing, the sheet expands under the influence of the monomer, and occupies the entire surface of the chamber. The monomer is then caused to polymerize and in the course of polymerization, which is effected by subjecting the mold to a temperature of 45° C. in a water bath for eight hours and by thereafter subjecting the mold to steam at a temperature of 100° C. for an additional eight hours, additional swelling and thus, considerable creasing of the polyvinyl chloride sheet is obtained. The resulting solid plate of synthetic material, when removed from the mold, shows from the edge a designed, homogeneous composition. Seen from above and seen through, the plate shows an impressive design. The plate can be worked exactly like polymethyl methacrylate. It may be bent, blown and drawn in thermoplastic condition. In the course of thermoplastic shaping, additional changes in the design may be developed to give further novel effects.

I claim:

1. The method of casting polymerizable plastic material to form solid plastic articles having interior configurations comprising the steps of disposing within a mold chamber a solid plastic material which is subject to substantial swelling in the presence of a polymerizable liquid monomer, surrounding the solid plastic material within the confines of the mold chamber with a polymerizable liquid monomer, swelling the solid plastic material by contact with said monomer for a time sufficient to substantially deform the solid plastic material, and polymerizing the monomer about the deformed solid plastic material, said solid plastic material and said monomer being dissimilar materials.

2. The method of claim 1 wherein the solid plastic material and polymerized monomer are thermoplastic in nature.

3. The method of claim 1 wherein the solid plastic material is polyvinyl chloride.

4. The method of claim 1 wherein the liquid monomer is a monomeric methacrylate.

5. The method of claim 1 wherein a polymerized methacrylate is added to the liquid monomer prior to polymerization.

6. The method of claim 1 wherein the monomer is partially polymerized prior to casting.

7. The method of claim 1 wherein the solid plastic material is in the form of a sheet.

References Cited in the file of this patent

UNITED STATES PATENTS

| 2,326,531 | Gates | Aug. 10, 1943 |
| 2,586,978 | Murray | Feb. 26, 1952 |
| 2,595,734 | Toulmin | May 6, 1952 |
| 2,668,328 | Porter | Feb. 9, 1954 |

FOREIGN PATENTS

| 482,836 | Great Britain | Apr. 5, 1938 |